June 27, 1933.  M. TIBBETTS  1,916,086
INTERNAL COMBUSTION ENGINE
Original Filed March 14, 1927    2 Sheets-Sheet 2

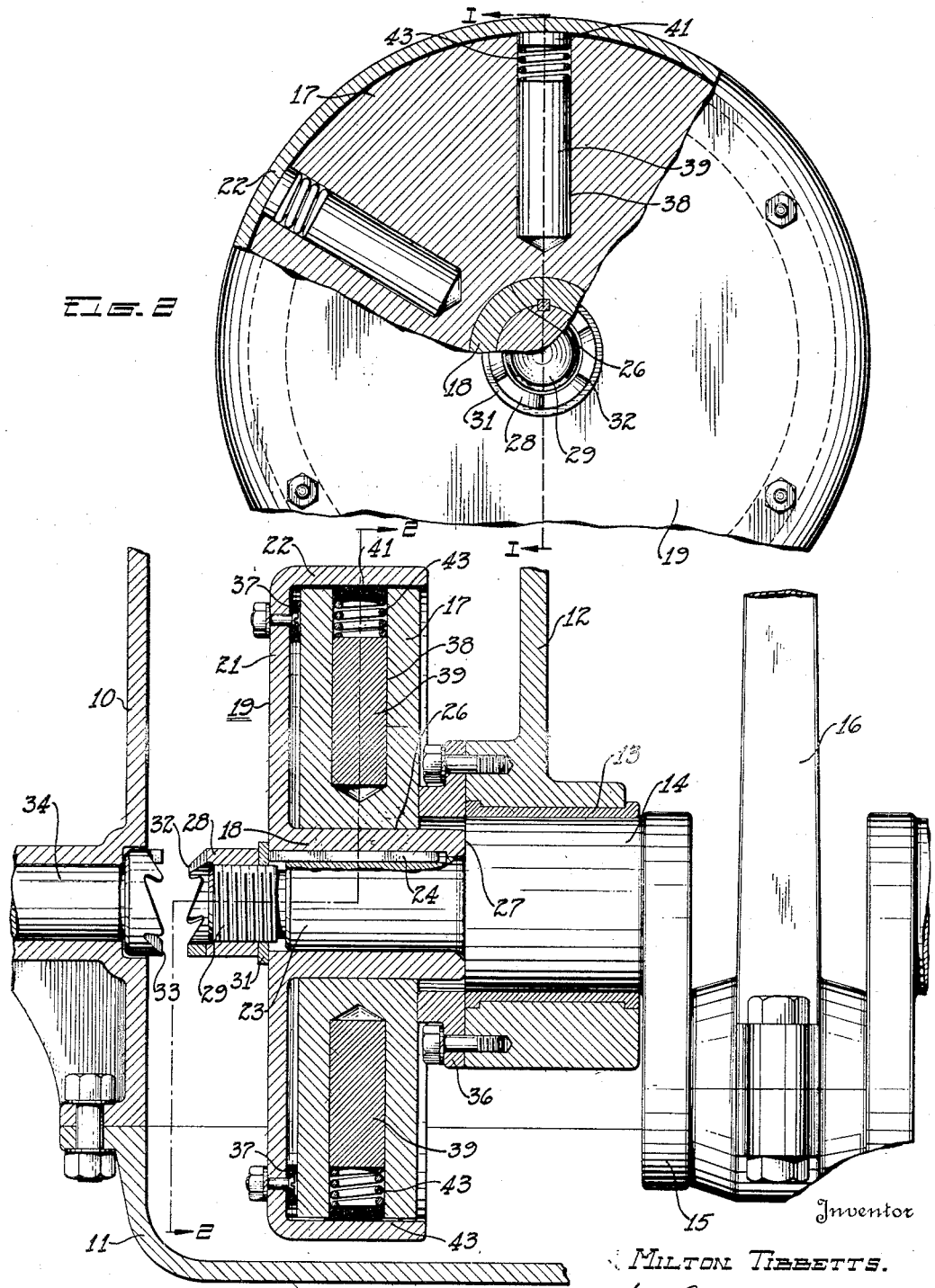

Inventor
MILTON TIBBETTS.
By L. A. Wright
Attorney

Patented June 27, 1933

1,916,086

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed March 14, 1927, Serial No. 175,089. Renewed March 5, 1932.

This invention relates to internal combustion engines and particularly to means for damping torsional vibration in the shafts of such engines.

It has for one of its objects to provide such a vibration damper in which the damping effect shall be varied in accordance with the speed of the shaft.

Another object of the invention is to provide vibration damping means in which the frictional load shall be varied by the centrifugal force of rotation acting on parts of the device.

Another object of the invention is to provide a constant damping effect for the vibration occurring at low engine speed, and a variable damping effect for the vibration occurring at the higher engine speeds.

Another object of the invention is to provide a vibration damper which shall be self-contained, and in which the moving parts shall be enclosed as much as possible.

A further object of the invention is to provide a vibration damper which will secure the desired results recited, and which will be at the same time in inherent balance on the shaft.

Other objects of the invention will appear from the following description taken in connection with the drawings, which form a part of this specification, and in which:

Fig. 1 is a vertical longitudinal section through a portion of an internal combustion engine having a vibration damper embodying this invention, substantially on the line 1—1 of Fig. 2;

Fig. 2 is a front elevation of part of the device shown in Fig. 1, partially broken away and partially in section substantially on the line 2—2 of Fig. 1;

Figure 3:
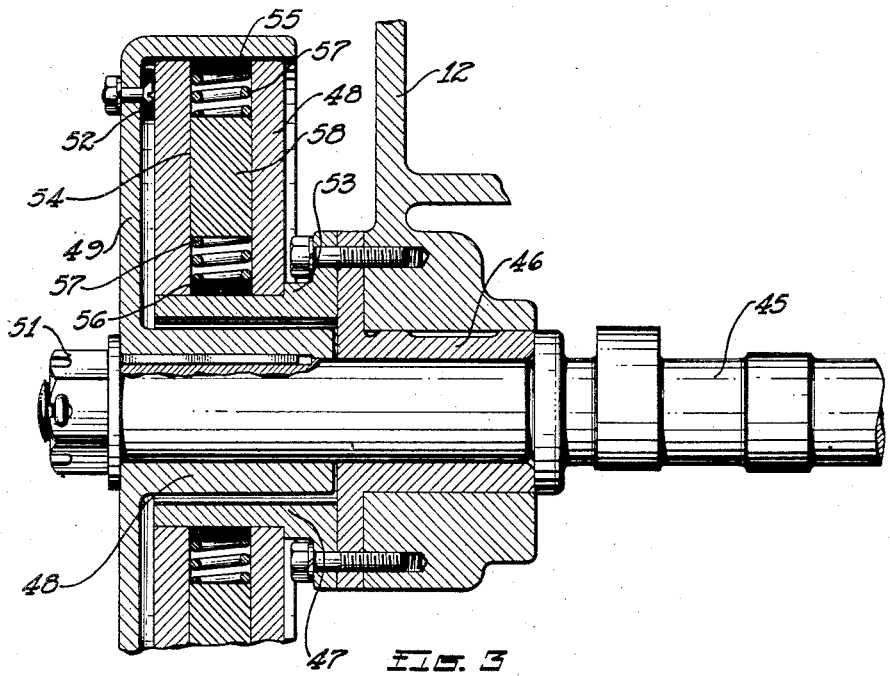
Fig. 3 is a view in longitudinal section showing a modification of the invention particularly adapted for use on engine camshafts.

Referring to the drawings, 10 represents the crankcase of an internal combustion engine having a removable lower cover or oil pan 11 and provided with transverse webs 12. These webs support suitable alined bearings such as 13 for an engine crankshaft 14, which has the usual integral cranks 15, each of which is connected by a connecting rod 16 with a piston mounted in one of the engine cylinders, the piston and cylinders not being shown in the drawings but being of usual construction.

The damping means of this invention is illustrated in Fig. 1 as mounted at or adjacent the end of the crankshaft 14. It is in the form of a cylindrical inertia member 17 which is mounted co-axially with the crankshaft and upon a suitable bearing part thereof. As shown, this bearing part is a shaft member 18 forming the hub of a friction member or drum 19 having a web portion 21 and an axially disposed flange portion 22. The hub 18 is keyed to the reduced end 23 of the crankshaft as indicated at 24. The bearing portion of this member 18 is indicated at 26 and the inertia member 17 is adapted to fit on this portion 26 for rotative movement thereon. One end of the member 18 preferably abuts a shoulder 27 formed by reducing the end of the shaft, and it is retained in axial position thereon by a nut 28 on the threaded end 29 of the crankshaft. The nut operates through a washer 31 against the outer face of the drum 19, and also against the key 24, so that the drum is rigidly secured to the crankshaft to rotate therewith. The inertia member 17, however, is free to turn on the bearing portion 26 except as hereinafter described.

The end of the nut 28 is preferably formed with clutch teeth 32 which may be engaged with similar teeth 33 on an endwise movable starter shaft 34. This is the usual hand starting crank for manually rotating the crankshaft for starting. The inertia member 17 is also positioned axially on the member 18, as by an abutment 36 on one side, which may be removably secured to the crankcase web 12, and by driving members or friction buttons 37 on the other side. These buttons 37 are preferably secured to the web 21 near the periphery and serve to frictionally connect the inertia member to the crankshaft in driving relation through the drum 19.

The inertia member is formed with a number of evenly spaced holes or recesses 38, preferably cylindrical in form, which are radially disposed therein and extend inwardly from the periphery. In each of these holes a suitable weight member 39 is slidably mounted, the weight members being of substantially equal mass. Friction devices or shoes 41 are also mounted in the holes 38 and are adapted for small axial movements therein. These shoes may be constructed of any suitable friction material, and are preferably in the form of thin disks of light weight which move easily. They are adapted to frictionally engage the inner surface of the drum flange 22.

Suitable means is provided for obtaining an initial contact of the shoes 41 with their co-operating surface. In the embodiment of the invention illustrated in Fig. 1, this means is carried in the inertia member, and constitutes a coil spring 43, arranged between the outer end of each weight member and the adjacent friction shoe. These springs are under an initial compression so as to urge their respective shoes into engagement with the co-operating surface.

It will be evident that in this way a small and substantially constant braking pressure is exerted by each of the shoes, which braking effort resists forces tending to move the inertia member relatively to the drum, and retards any such relative movement. Such frictional resistance is well adapted to dissipate the energy of torsional vibrations in the crankshaft, which vibrations tend to cause an alternating relative movement between the drum 19, which is fixed to the shaft, and the inertia member 17, as will be readily understood by those skilled in the art to which this invention relates. The constant friction thus secured is particularly well adapted for damping the vibrations in the low part of the speed range of the shaft, which vibrations are usually of less power than those which occur in the upper part of the speed range.

As the shaft speed increases and the amplitude of the vibration in the various periods is greater, the weight members 39 come into play. Under the centrifugal force of rotation these weights move radially outward in their respective holes 38, thus increasing the load on the springs and the resulting pressure on the shoes 41. This, of course, increases the friction between these shoes and the drum flange 22. This increased friction is sufficient to take care of the increased vibratory energy at the higher engine speeds, and it will be apparent that the invention thus provides a device in which the damping effect is increased in accordance with the speed by reason of the centrifugal action of members carried by the damper. Also, since the mass of the structure is symmetrically disposed about the axis of rotation, the damper is in inherent balance on the shaft.

In Fig. 3 is illusrated another form of the invention particularly adapted for use on an engine camshaft. The requirements for a camshaft damper or brake are somewhat different from the requirements for a crankshaft damper, in that the latter must damp induced vibrations, which are of relatively high frequency, and which are usually most prominent at high shaft speeds, whereas in the camshaft the vibrations to be damped are the forced vibrations caused by cam reaction, are of relatively low frequency, and are usually most objectionable at the lower shaft speeds. In a camshaft, therefore, the damping effect should be greatest at the lower speeds and should decrease at the higher speeds, where it is not needed, in order to prevent the loss of the power required to drive the shaft against the damping resistance, and excessive wear of the parts.

In the device illustrated the camshaft 45, which is journaled in suitable bearings, projects at one end through an end bearing 46 supported in the crankcase web 12. Secured to the bearing 46 and surrounding and co-axial with the end of the shaft 45 is a stationary bearing member 47 on which the inertia member 48 is journaled. A friction drum 49 is keyed to the end of the shaft 45 to rotate therewith, and is retained on the shaft in any convenient way, as by the nut 51 threaded to the reduced end of the shaft. The web portion of the drum 49 is preferably provided with suitable friction members or buttons 52, between which, and a shoulder 53 formed on the bearing member 47, the inertia member 48 may be positioned axially of the shaft.

The inertia member is formed with a number of radially disposed holes or bores 54, which are preferably cylindrical in form, similar to the holes 38 shown in Figs. 1 and 2 except that they extend completely through the inertia member from the bearing surface to the periphery thereof. In each of these bores is a pair of friction devices or shoes 55 and 56, of which the outer shoe 55 is adapted to frictionally engage the inner surface of the flange of the drum 49, and the inner shoe 56 is adapted to engage the bearing surface of the member 47. The shoes are urged in opposite directions into contact with their co-operating surfaces, by helical compression springs 57, and the other ends of each of these springs abut the respective ends of a weight member 58, slidably mounted in the bore 54 between the springs.

It will be evident that the combined friction of the shoes 55 and the buttons 52 drives the inertia member 48 from the friction drum 49, which is keyed to the shaft 45, and it will be equally apparent that this motion of the inertia member is resisted by the friction of the inner shoes 56 against the surface of the stationary bearing member 47. At low speeds, the pressure exerted by the springs 57 is equal, so that the pressure of the shoes is substantially the same. However, the outer shoe 55 acts at the greater radius and therefore does more work than the shoe 56, and its friction, plus the constant friction of the buttons 52, insures the driving of the inertia member. At the same time, the resisting friction of the shoes 56 provides a heavy braking force which serves to damp the forced vibration in the shaft 45 caused by the alternative positive and negative torque due to cam reaction.

At the higher shaft speeds, however, the centrifugal force acting on the heavy weight members 58 tends to move them radially outward in their bores 54 against the outer springs 57. This relieves part of the pressure on the inner springs and accordingly the braking pressure on the shoes 56 is lessened, so that less resistance or damping action is provided. The compression of the outer springs 57 is, however, increased, so that the shoes 55 are more firmly engaged with the flange of the friction drum 49, which serves to more securely lock these members together, whereby the inertia member is driven. As the friction of the shoes 56 is decreased, that of the shoe 55 is increased, and it will be seen that this device progressively decreases the damping action as the speed of the shaft increases, which condition is most desirable for a camshaft damper.

Figure 4:
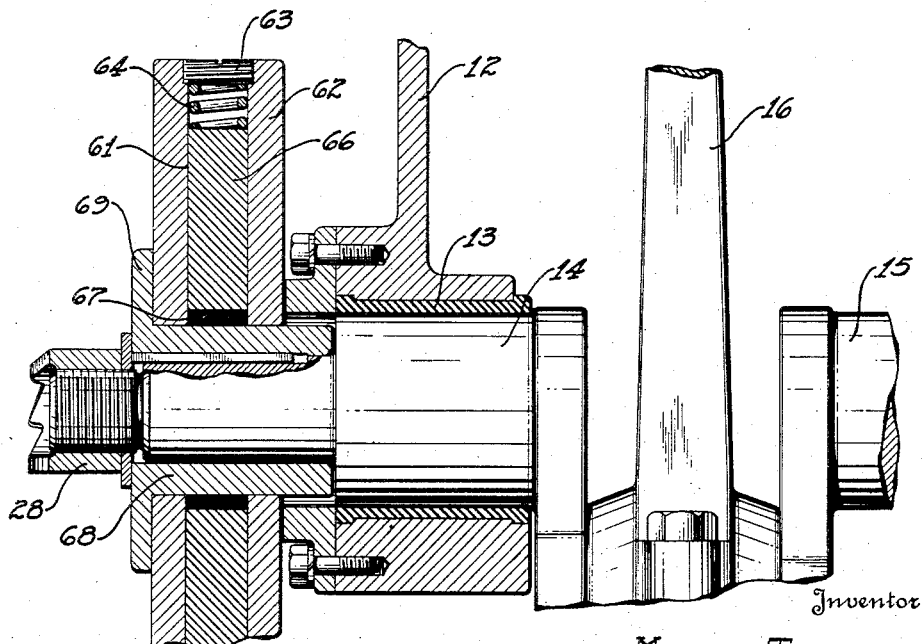
Fig. 4 is a view similar to Fig. 1, showing another modification of the invention.

In Fig. 4 is shown a further form of the invention which may be used when it is desirable to reduce the damping effect at the higher shaft speeds. In this arrangement, which is illustrated as applied to the crankshaft 14, radially disposed holes or bores 61 extend completely through the body of the inertia member 62, as in the form shown in Fig. 3. The outer end of each of these bores is closed by a threaded plug 63, which forms an adjustable abutment for a compression spring 64. The inner end of the spring 64 is in contact with a weight member 66, slidably mounted in the bore 61 in the manner previously described. At the inner end of the bore is a friction shoe 67 which bears against the bearing member 68 on which the inertia member is journaled. It will be understood that the bearing member 68 is keyed to the end of the shaft 14 and is retained thereon by any suitable device such as the nut 28. It is also provided with a flange 69 by means of which the inertia member may be retained on the shaft.

The friction shoe 67 is in contact with the inner end of the weight member 66, and when the shaft 14 is at rest, and also at low shaft speeds, this shoe will be urged against the bearing surface of the member 68 by the spring 64, acting through the weight member, thus providing the frictional resistance to relative movement between the inertia member and the shaft by which damping is effected. As the speed of the shaft increases, the centrifugal force acting on the weight member 66 tends to move it outwardly in its bore against the spring 64, and this movement relieves the pressure on the shoe 67 and lessens the friction thereof, thus reducing the damping effect.

It will be evident that the vibration damper provided by this invention is a simple and compact device, which provides a damping effect that varies in accordance with changes in the shaft speed. The weight members of the various forms of this invention constitute a speed responsive device, which as illustrated is carried by and completely enclosed within the inertia member. Such mounting is not essential to the operation of the invention, however, and it will be understood that the weight members may be of any suitable form and mounted in any way such that the centrifugal force causes them to actuate the friction devices. The periphery of the inertia member is practically enclosed by the flange of the friction drum, so that none of the friction surfaces are exposed, and excessive wear from dirt and other foreign matter is thus obviated. At the same time the device may be readily disassembled, so that those parts which are subjected to wear may be easily and inexpensively renewed.

It will be understood that various forms of the invention other than those described above may be used without departing from the spirit or scope of the invention.

Having thus described the invention, what is claimed and desired to be secured by Letters Patent is:

1. The combination with a shaft, of a vibration damper comprising a friction member secured to said shaft to rotate therewith, an inertia member journaled on a portion of said friction member, friction devices between the inertia member and the friction member, springs to actuate said devices, and weight members in said inertia member responsive to centrifugal force to vary the friction as the speed increases.

2. A vibration damper for a shaft comprising a rotatable inertia member, radially movable weight members carried by said inertia member, means fixed with respect to said shaft, and friction means resiliently connected to the weight members, contacting with said last-named means, and actuated by the centrifugal pressure of said weight members to resist rotation of the inertia member relative to the shaft.

3. A vibration damper for a shaft comprising a rotatably mounted inertia member, means fixed with respect to said shaft, friction devices associated with said inertia member for engaging said means to retard movement of the inertia member relative to the shaft, weight members movable in response to centrifugal force to actuate the friction devices, and means connecting said weight members and said friction devices.

4. A vibration damper for a shaft comprising a friction drum fixed thereto, a rotatably mounted inertia member, a friction device carried by the inertia member and adapted to frictionally engage the drum, a weight member radially movable on the inertia member in response to the centrifugal force of rotation, and means connecting the weight member with said friction device.

5. A vibration damper for a shaft comprising a rotatable inertia member thereon, a weight member radially movable on the inertia member, means fixed with respect to said shaft and a friction shoe alined with the weight member and resiliently connected thereto said shoe engaging said means to retard movement of the inertia member relative to the shaft, said shoe being actuated by centrifugal pressure of the weight member to further retard said relative movement as the speed increases.

6. A vibration damper for a shaft having an inertia member, means fixed with respect to said shaft, a radially movable weight member associated with said inertia member a friction device engaging said means to retard relative movement between the inertia member and the shaft, and a spring connecting the weight member to said friction device.

7. A vibration damper for a shaft comprising a shaft member, an inertia member journaled on said shaft member, a friction device to resist relative rotation between the inertia member and the shaft member, a spring urging the friction device into engagement with the shaft member, and a weight member associated with the spring and acting to increase the force exerted by the latter on the friction device as the speed increases.

8. A vibration damper for a shaft comprising a friction drum fixed on the shaft and having a web and a flanged portion, a cylindrical inertia member journaled coaxially with the drum having radially disposed holes, friction shoes in the holes adapted to engage the drum flange, weight members slidably mounted in said holes resiliently connected to said shoes, and means frictionally connecting the drum web to the inertia member in driving relation.

9. A vibration damper for a shaft comprising a rotatable inertia member driven by the shaft and adapted to rotate relatively thereto in response to shaft vibration, means fixed with respect to said shaft, friction devices carried by the inertia member engaging said means to dissipate the energy of such relative rotation, and a weight member responsive to centrifugal force and connected to each friction device to vary the friction thereof as the shaft speed increases.

10. A vibration damper for a shaft comprising a shaft member having a bearing, an inertia member journaled on the bearing, friction members carried by the inertia member to resist relative movement between the inertia member and the bearing, and means including weight members adapted to vary said resistance as the speed changes.

11. A vibration damper for a shaft comprising a friction member rigidly secured thereto having a flange, an inertia member journaled concentrically with the shaft adjacent the friction member, radially disposed weight members carried by the inertia member, devices on the inertia member frictionally contacting said flange, and resilient means connecting each of said devices to one of said weight members.

12. A vibration damper for a shaft comprising a friction member rigidly secured to the shaft, a rotatable inertia member having radially disposed holes, weight members slidably mounted in said holes, a shoe in each hole urged to frictionally engage the friction member by the centrifugal pressure of the weight member, and a spring between the weight member and said shoe.

13. In a vibration damper for a rotatable shaft member, the combination with an inertia member mounted for rotation with respect to the shaft member, said members carrying cooperating friction developing surfaces for retarding relative movement thereof, weight means carried by one of said members and radially movable with respect to said friction developing surfaces in response to changes in centrifugal force to vary the friction between said surfaces, and yielding means exerting an initial pressure between said friction developing surfaces.

14. In a vibration damper for a rotatable shaft member, the combination with an inertia member mounted for rotation with respect to the shaft member, said members carrying cooperating friction developing surfaces for retarding relative movement thereof, weight means carried by and radially movable with respect to one of said members, said weight means being associated with and exerting varying pressure between said friction developing surfaces as the result of radial movement of said weight means in response to centrifugal force, and yielding means exerting an initial pressure between said friction developing surfaces.

15. In a vibration damper for a rotatable shaft, the combination with an inertia member supported for rotation with respect to the shaft, a friction shoe carried by said inertia member, means rotating with said shaft and engaged by said shoe for retarding relative movement of said weight member and shaft, a weight member carried by said inertia member and movable radially thereof in response to centrifugal force, and a resilient element carried by said inertia member and arranged in tandem with said weight member for exerting thrust on said shoe, whereby an initial pressure may be established between said shoe and the means engaged thereby, such pressure being variable when the speed of rotation of said inertia member is varied.

16. In a vibration damper for a shaft, the combination with a member carried by the shaft, an inertia member rotatable with respect to the shaft, a friction shoe carried by said inertia member and engaging said shaft member to resist relative rotation therebetween, a weight carried by said inertia member and movable radially thereof in response to centrifugal force, and a spring carried by said inertia member and exerting radial thrust, said weight and spring being arranged in tandem between said inertia member and said shoe to exert thrust thereon varying with the speed of rotation of said inertia member.

17. In a vibration damper for a shaft member, the combination with an inertia member mounted for rotation with respect to the shaft member, means including a friction device acting between the inertia member and the shaft to resist relative rotation thereof, resilient means associated with said friction device to increase the resistance offered thereby, and a weight carried by one of said members and movable in response to centrifugal force to vary the effect of said resilient means as the speed of rotation varies.

18. In a vibration damper for a shaft, the combination with a hub member carried by said shaft, an inertia member supported for rotation on said hub member, a weight supported by said inertia member and movable radially outward of the latter in response to centrifugal force, said weight member having a friction connection with said hub member, and resilient means acting between said inertia member and weight for urging the latter inwardly to increase the friction developed by said friction connection.

19. In a vibration damper for a shaft member, the combination with an inertia member mounted for rotation with respect to the shaft member, means including a friction device acting between the inertia member and the shaft to resist relative rotation thereof, resilient means associated with said friction device to increase the resistance offered thereby, and a weight carried by one of said members and associated with said friction device, said weight being movable outwardly in response to increase in speed of rotation of the said member to reduce the effect of said resilient means.

20. In a vibration damper for a rotatable shaft, the combination with a member carried by said shaft and having an internal friction surface, a fixed member having an external friction surface, an inertia member mounted for rotation with respect to the shaft, a weight member carried by said inertia member and movable radially thereof in response to centrifugal force, and resilient means normally under compression between said weight member and each of said friction surfaces and having friction connections with the latter.

21. In a vibration damper for a rotatable shaft, the combination with a member carried by said shaft and having an internal friction surface, a fixed member having an external friction surface, an inertia member mounted on said fixed member for rotation with respect to the shaft, a weight member carried by said inertia member and movable radially thereof in response to centrifugal force, and resilient means normally under compression between said weight member and each of said friction surfaces and having friction connections with the latter.

In testimony whereof I affix my signature.

MILTON TIBBETTS.